Oct. 3, 1972 P. GREGUSS ET AL 3,695,825
ACOUSTIC METHOD FOR THE POSTTREATMENT OF FIBERS
Filed March 30, 1970 3 Sheets-Sheet 1
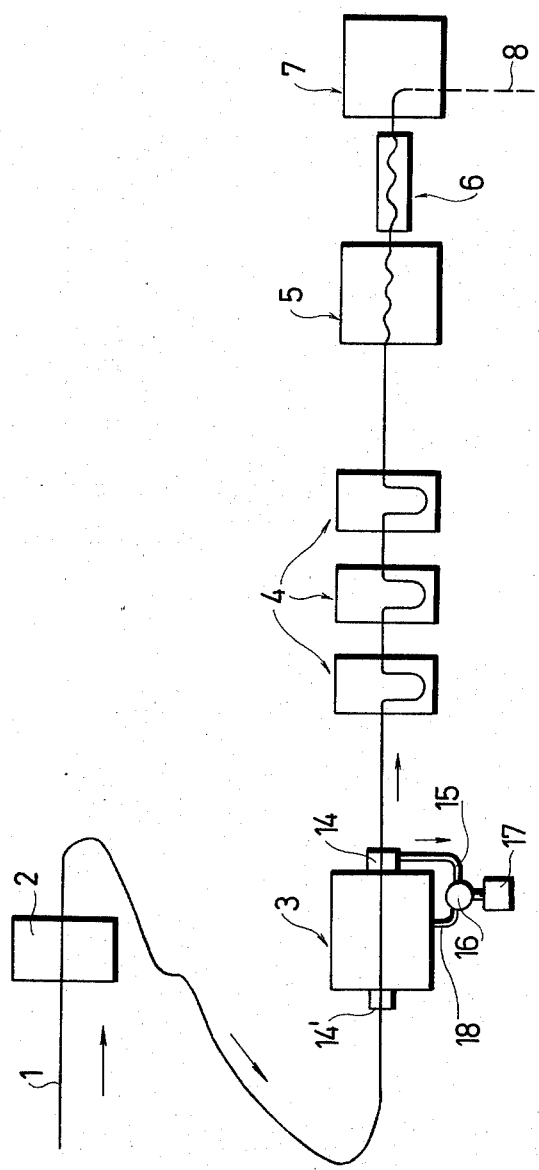
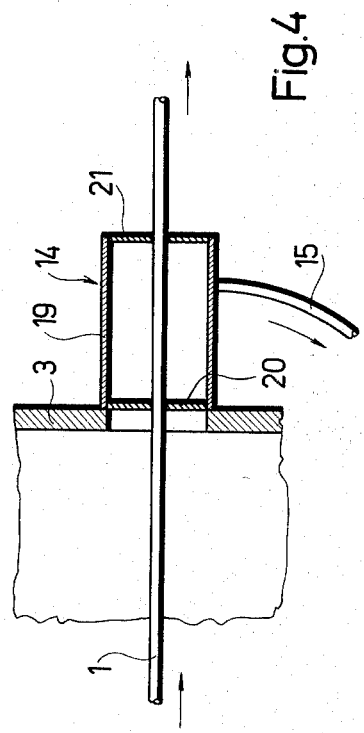
INVENTORS:
PAL GREGUSS, SANDOR B. NAGY,
JANOS ERDEI AND LAJOS TOTH
BY: Arthur O. Klein
ATTORNEY

United States Patent Office 3,695,825
Patented Oct. 3, 1972

3,695,825
ACOUSTIC METHOD FOR THE POSTTREATMENT OF FIBERS
Pal Greguss and Sandor B. Nagy, Budapest, and Janos Erdei and Lajos Toth, Nyergesujfalu, Hungary, assignors to Magyar Viscosa Gyar, Nyergesujfalu, Hungary
Continuation-in-part of application Ser. No. 616,205, Feb. 15, 1967. This application Mar. 30, 1970, Ser. No. 23,878
Int. Cl. D01c
U.S. Cl. 8—137                                                  6 Claims

ABSTRACT OF THE DISCLOSURE

An apparatus and a method for the posttreatment of fibers including the removal of valuable, reusable impurities from the fibers wherein the fibers are led through a wash-liquor in which an acoustic field is excited.

---

This application is a continuation-in-part of application Ser. No. 616,205, filed Feb. 15, 1967, now abandoned.

The invention relates to the posttreatment of fibers, including the removal of impurities impairing the quality of the final product formed or obtained in the course of the production of synthetic and natural fibers. The removal of said impurities is essentially a cleaning process.

Although the term cleaning is generally used for the removal of impurities, the notion "impurities" can only be defined specially for each specific case. In the manufacture of e.g. a polyamide fiber the monomer content remaining in the fibers after fiber formation is considered as impurity but the monomer in the wash-liquor is a valuable raw-material.

The removal of impurities is an operation closely associated wtih physics and chemistry. In order to wash the impurities from the fibers to be cleaned and to which they adhere, the degree of adhesion is to be reduced. This can be performed partly by a chemical agent and partly by the mechanical effect due to the flow of the wash-liquor. These mechanical effects can be critical for the efficiency of the cleaning process, as it is essentially the mechanical effect which removes the adhering impurities.

The conventional methods can be ranged into two groups. According to the one, the undesirable impurities are removed after the fiber formation by washing and according to the other the fiber slices are extracted prior to the fiber formation e.g. in the production of polyamide silk fibers. The disadvantages of both methods are the following:

(1) A bulky apparatus is necessary.
(2) The machinery and the building required are expensive.
(3) The maintenance of the machines is costly.
(4) They require a high amount of electrical and thermal power.
(5) They require a large number of personnel.
(6) One kind of apparatus can be used for the posttreatment of only one product.
(7) In case the wash-liquor is flowing in the usual direction, the boundary layers, which take an important part in the removal of the impurities, are exchanged only to a small extent, and very slowly.

The aim of the invention is to eliminate those disadvantages. According to the present invention this aim is achieved by leading the fibers through a wash-liquor in which an acoustic field is excited. Preferably, the wash-liquor used for the acoustic field is used at the same time as a coupling medium. If simultaneously with the flow of the wash-liquor, an acoustic field having an intensity by which cavitation can arise in the liquor is insured, the exchange of the boundary layers is highly accelerated, and the time required for the removal of the impurities is shortened. In the course of the experiments it was found that if a natural or synthetic fiber is placed after the fiber formation into an acoustic field exceeding the cavitation level, the impurities formed during the production can be removed in a split second per unit volume. It could be therefore concluded that for the quick removal of the monomer content from polyamide fibers an acoustic field of intense cavitation would be necessary. But this is not the case because too intense cavitation can cause undesired damage in the material. Though the known depolymerising effect of the acoustic field comes into force only in the high frequency range and for the posttreatment of fibers, an acoustic field of lower frequency e.g. under 40 kHz., is used. Due to technological considerations, however, care must be taken to adjust the level of cavitation for every fiber type. The value of cavitation can be determined for every fiber type by a short test.

It has been found that in the case of posttreatment natural and synthetic fibers in an acoustic field it is expedient to form a cable from the fibers. This cable can be formed with the aid of appropriate guide means to a shape most suitable for the acoustic field e.g. a flat band. The wash-liquor which in case of the removal of monomer form polyamide, may be e.g. water, should be introduced in the acoustic field preferably in counter-current to the movement of the fibers. The temperature of the posttreating bath which is different for each fiber type is to be carefully controlled, as it influences the cavitation level. As the efficiency of the process is substantially influenced by the extent to which the wash-liquor is enriched due to the removed impurities, i.e. in monomer, the monomer concentration of the wash-liquor is to be checked continuously, and accordingly the flow velocity of the wash-liquor through the acoustic field is to be controlled automatically as the function of the amount of the removed impurities. For this purpose the dielectric method of measuring proved to be most suitable.

According to the invention the fibers can be stretched preferably before, after or during the time they are led through the acoustic field.

The process according to the invention for the posttreatment of fibers results in the following technical and economic advantages as compared with the known methods:

(1) The machinery used for implementing the method according to the invention has small dimensions.
(2) The costs of investment are small, both in respect of the machinery and the building; the latter can be dispensed with in most cases.
(3) The maintenance of the machinery is reduced to the replacement of used components e.g. vacuum tubes, and therefore does not involve great expenses.
(4) The machinery requires very little electrical and thermal power.
(5) Only one single attendant is required for checking the operation of the machine.
(6) One apparatus can be used for the post treatment of different materials without any modification or with at most slight modifications.
(7) The impurities removed from the fibers and contained in the wash-liquor e.g. in the case of polyamide fibers the removed monomer, is a valuable raw material the enriching of which is of great economic importance because its recovery requires little energy.
(8) It improves the mechanical characteristics of the fibers, e.g. tensile strength, wear resistance, readiness for dyeing.

In the accompanying drawings, which show non-limiting examples of apparatus in accordance with the invention, FIG. 1 is a schematic view of fiber treatment apparatus in accordance with the invention;

FIG. 4 is a fragmentary view in axial section through the exit seal of the tank provided with the acoustic field.

Figure 2:
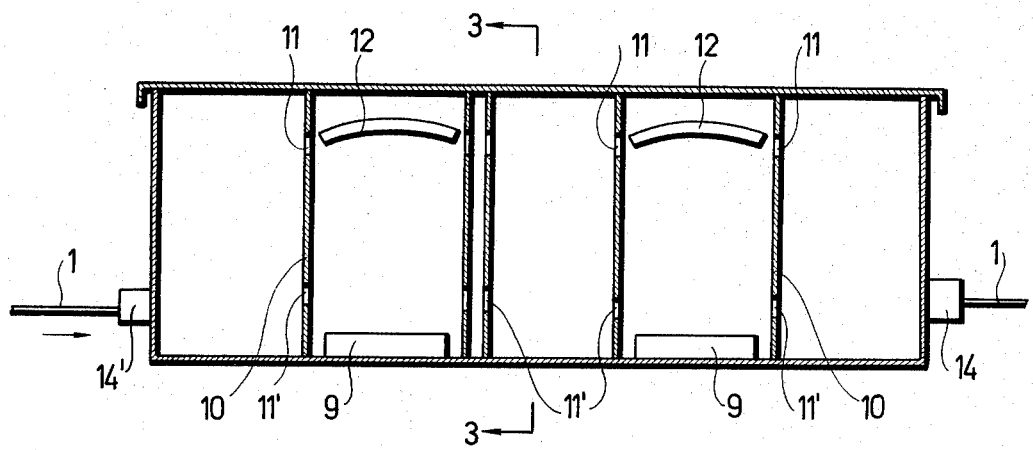
FIG. 2 is a view in vertical longitudinal section of the tank which contains the bath wherein the fibers are subjected to an acoustic field.
Figure 3:
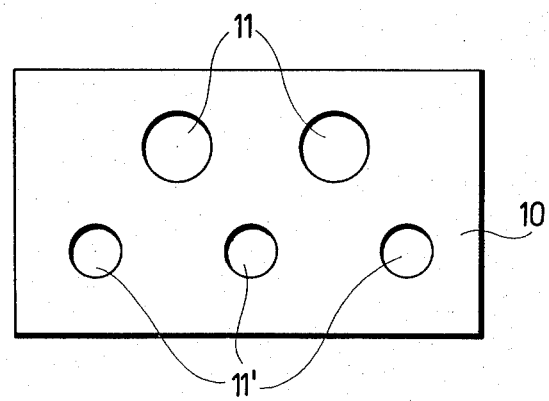
FIG. 3 is a view in end elevation of a perforated partition employed in the tank of FIG. 2, the view being taken from line 3—3 of FIG. 2.

As shown in FIG. 1, a cable 1 of fibers is led through a first tank 2 of wash water, and thence into a second tank 3 wherein it is subjected to an ultrasonic acoustic field in the manner more clearly shown in FIGS. 2 and 3. The cable 1 is withdrawn from tank 3 by a stretching device 4 which forwards it to a curling unit 5 and to a station 6 for the fixation of the curled fibers by heat. The fixed curled fibers are then fed to a cutting unit 7 where they are cut into fiber slices 8.

The tank 3, which is shown in FIG. 2, is divided into five sub-compartments of substantially equal length along its length by vertical partition plates 10. The plates 10, of which one is shown in FIG. 3, are shown as having three laterally spaced lower holes 11' therethrough and two larger upper laterally spaced holes therethrough. In this instance, three cables 1 are being treated, one cable travelling through each set of successive aligned holes 11' from an entering sleeve 14' with which it forms a substantial seal to an exit sleeve 14. The second and fourth sub-compartments are each provided with electroacoustic transducer 9 at the bottom and a concave acoustic mirror 12 at the top facing the transducers, the mirrors improving the efficiency of the acoustic field.

The exit sleeve 14 has a housing 19 provided with a rubber-like seal 20 at its entrance end and a similar seal 21 at its exit end. The interior of housing 19 is subjected to a vacuum by a pump 16 driven by a motor 17, the pump being connected to the housing by a conduit 15. Liquid monomer is thus stripped from the cable 1. The monomer removed from the cable in this manner is returned to tank 3 by the pump through conduit 18.

The method of the invention is illustrated by the following general description and specific examples.

GENERAL DESCRIPTION

In the manufacture of polyamide fibers in accordance with the invention, the following method is carried out.

From the synthetic fibers a cable is formed with a monomer content of 9 to 9.5 percent. This cable is led through a vessel filled with liquid e.g. with water the temperature of which is 50 to 60° C. The travelling velocity of the cable is 30 m./sec. The water in the vessel is excited with an acoustic energy of approx. 20 kHz. frequency with an intensity suitable for obtaining the desired cavitation level. The temperature of the water is continuously checked. The monomer content of the cable leaving the water is 1.5 to 2 percent. The monomer content of the water is continuously checked by the aid of an instrument. Experiments have proved that the monomer content of the polyamide cable can be reduced from 9 to 9.5 percent to 1.5 to 2 percent during approx. 0.7 to 12 seconds. The water is caused to pass through the apparatus with a velocity which enables to enrich its monomer content to approx. 30 percent because in this way the valuable monomer raw material can be recovered economically. The cable stripped of monomer leaving the vessel is led into a stretching machine where the orientation of the chain molecules takes place. As in the process according to the invention the polyamide fiber contains no more excess monomer at this stage the chain molecules are closely juxtaposed and there is no space between them. This fact increases the strength of the fiber e.g. improves its tensile strength and wear resistance to a great extent. The fiber leaving the stretching machine is led into a crimping machine where it is crimped to the desired extent and the curling is fixed by a heat setting device. From here the fiber is led into a cutting device where it is cut to the desired length. The cut up fiber is baled. The cable stripped of monomer leaving the vessel is passing through the stretching machine and the crimping machine and loses most of its humidity. The remaining humidity is discharged in the heat setting device. Thus in the method according to the invention not only the bulky washing apparatus but also the conventional drying apparatus of great size can be dispensed with. By removing the monomer content from the polyamide fiber prior to stretching, an improved fiber structure can be achieved than by the conventional washing method by which the monomer content remains in the fiber during the stretching and therefore the fiber structure is looser after washing out the monomer content but reduces the fiber strength.

The monomer content which can be recovered by a conventional washing process is not more than 7 percent, because if the wash-liquor is more concentrated the water cannot wash out the monomer from the fiber to the desired extent because the rate of exchange of the boundary layers is low. According to the conventional technology the removal of the monomer content requires 30 to 60 minutes depending on the ratio of the polymer surface and on the specific volume, and requires washing and drying apparatus with a space requirement of 100 m.$^2$. In the process according to the invention on the other hand the surface requirement is only 1 to 2 m.$^2$ and the washing involves a few minutes only.

As pointed out hereinabove it is essential for an effective removal of impurities from the fibers to produce a cavitation effect by ultrasonic oscillations in the wash liquor.

Figure 5:
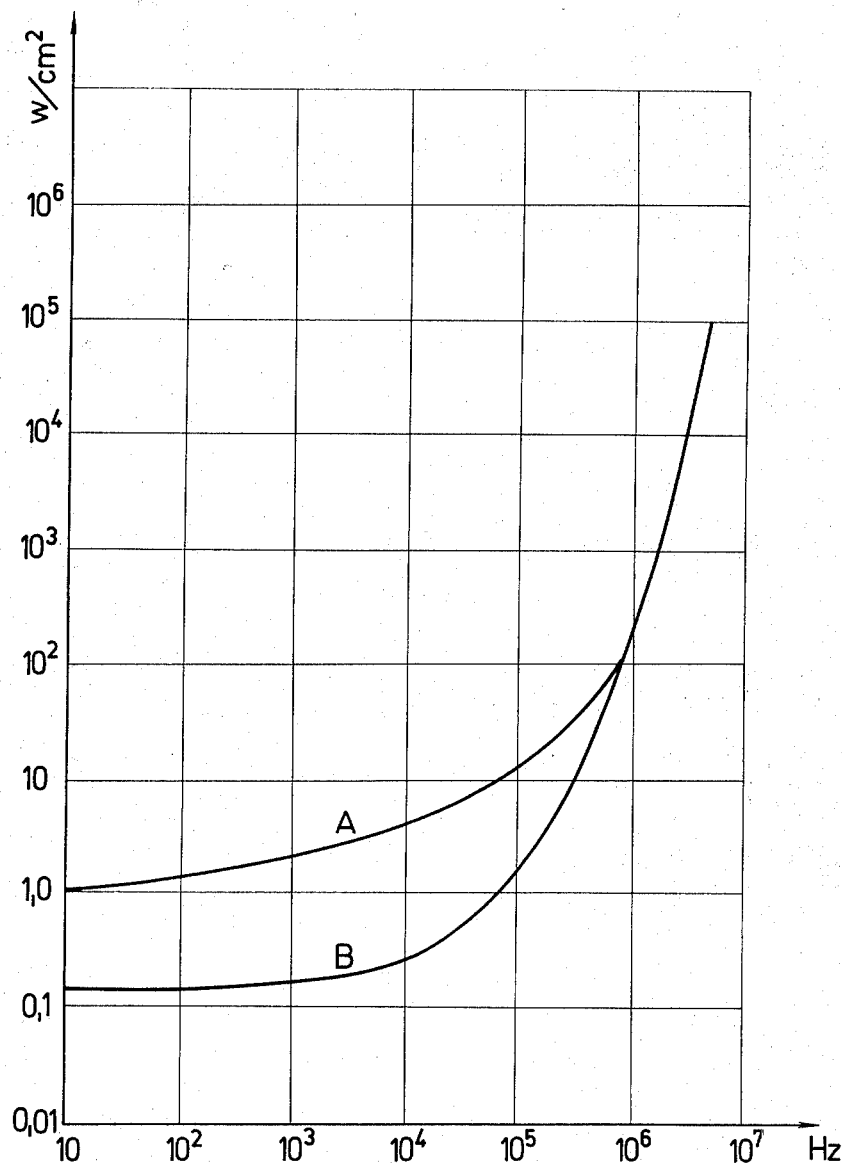
FIG. 5 is a graph showing cavitation thresholds for (A) degasified wash waters, and (B) gas-containing water, as functions of frequency and intensity of vibration.

In FIG. 5 there are reproduced two curves showing cavitation thresholds for (A) degasified water, and (B) gas-containing water, as functions of frequency and intensity of vibration. Intensity appears as the ordinate w./cm.$^2$, and frequency as the abscissa Hz. Cavitation appears for all points above and within the respective curves; there is no cavitation at any point below and outside the respective curves. Thus, for example, it is necessary when working with degassed water at a frequency of 20 kHz. (2·10$^4$) to produce cavitation in accordance with the method of the present invention for the transducers to impose an intensity of at least 1.5 w./cm.$^2$ to the wash water.

Example 1.—Polyamide-6 (polycaprolactan) cable with removal of the monomer content before stretching A cable of 400,000 deniers is formed from 4 denier fiber, this being the denier number of the final stretched product. After fiber formation, the monomer content is in the range from 8 to 10 percent. The cable is taken off from bobbins or cans on a warper frame in such a way that a band of uniform thickness is achieved, the breadth of which should not exceed 100 mm. The band is led through a bath of washing liquor in tank 2, the liquor being of a temperature of 60° C. with a degree of hardness of 0.2 NK°. The length of tank 2 is 800 to 1000 mm. The washing bath is followed by immersion in a bath in tank 3 in which the monomer content of the cable is removed. The dimensions of this second tank are 2,000 x 300 x 250 mm. This tank contains water of a temperature of 60° C., and a degree of hardness of 0.2 NK°. The water is used as coupling medium. The cable is drawn through the baths by the stretching device 4 at a velocity of 30 m./min. That means that in the case of a stretching in a ratio of 1:4 the velocity of the outgoing cable is 120 m./min. which involves a capacity of 330 kg./hour per cable. In the second bath in tank 3 the cable is treated with an acoustic energy of 20 kHz. frequency and 3 to 4 w./cm.² From the outgoing cable the water is sucked off at sleeve 14 by a vacuum pump 16 and is recirculated into the second tank 3 where the removal of monomer content takes place. The monomer content of the polyamide cable is 2 percent after the vacuum suction. The fresh water consumption is about 1 m.³/hour. The energy consumption of the whole machinery is 5.5 kwh., which includes the power consumption of the acoustic generator and the vacuum pump. The period of the removal of the monomer content is 6 seconds. After the removal of the monomer content the cable can be stretched, crimped, fixed and cut in any suitable known manner, as schematically shown in FIG. 1.

Example 2.—Polyamide cable, with removal of the monomer content before stretching The data are identical with the data given in Example 1 except the following:

Fiber fineness: 1.5 deniers
Velocity of the cable: 50 m./min.
Velocity of the outgoing cable: 125 m./min.
Ratio of the stretching: 1:2.5
Capacity: 340 kg./hour per cable
Fresh water consumption: 2 m.³/hour
Period of the removal of the monomer content: 4 sec.

Example 3.—Polyamide cable, with removal of the monomer content after stretching The starting material is a stretched and crimped cable of 400,000 deniers, which consists of 4 denier fiber.

The data are the same as in Example 1 except the following:

Velocity of the cable: 120 m./min.
Energy consumption: 8.5 kwh.
Period of the removal of the monomer content: 1.5 sec.

Example 4.—The posttreatment of viscose (regenerated hydrate cellulose) cable

A cable of $2 \times 10^6$ deniers is formed from 2.5 denier monofilaments. The cable coming out from the forming plate or jets is united into a band of uniform thickness the breadth of which should not exceed 100 mm. The cable formed in this way contains the cable forming liquid and $CS_2$ which can be recovered. The weight of the cable forming liquid is two or three times greater than that of the fiber material.

The major part, i.e. 95 to 98 percent, of the first acidic bath is removed by washing it in a first tank with a washing liquor being of a temperature of 20–25° C. with a degree of hardness of 0.1–0.2°. The dimensions of the tank are 5000 by 600 by 500 mm. The water flows in countercurrent to the cable.

In a second tank the dimensions of which are 2000 x 300 by 250 mm. four oscillating heads are arranged. The coupling liquid is a solution of $H_2O_2$ the concentration of which is 1.8–2 grams per liter. The use of $H_2O_2$ is preferable since in this case there is no need of further washing since the $H_2O_2$ decomposes when drying. With this method, the sulfur content can be decreased to 0.02–0.06 percent. Thereafter the cable is cut up and dried.

For the removal of the $CS_2$ content and the sulfur content, an acoustic energy of 20 kHz. frequency and 3 to 4 w./cm.² is used. The fresh water consumption used for the washing is about 12 m.³ and for the desulfurisation about 5 m.³. The cable forming capacity is 800 kg./hour.

Example 5.—The posttreatment of polynosic and high-wet-module cable

The polynosic fiber is made out of regenerated cellulose like the normal viscose cellulose. The difference between them is that the molecule chain is larger and the degree of polymerization is higher than that of the viscose cellulose, therefore its quality is better. One type of the polynosic fiber is the HWM fiber the wet tenacity of which is much more than that of the normal viscose cellulose fiber.

The apparatus used for this treatment is the same as in Example 4. The quantity of the flowing water is varied depending from the parameters of the fiber formation, e.g. the velocity and the dimension of the cable.

Although our invention has been illustrated and described with reference to the preferred embodiments thereof, we wish to have it understood that it is in no way limited to the details of such embodiments but is capable of numerous modifications within the scope of the appended claims.

What is claimed is:

1. A method for the post-treatment and purification of polymer fibers especially adapted for the removal of monomer from said fibers which comprises passing said fibers through an aqueous wash-liquor, maintaining in said wash-liquor an acoustic field exceeding the cavitation level but below 40 kHz., and maintaining the temperature of said wash-liquor below about 60° C., wherein the wash-liquor used for the acoustic field is used at the same time as a coupling medium.

2. A method as claimed in claim 1, wherein said wash-liquor is led through said acoustic field counter-currently to the movement of the fiber.

3. A method as claimed in claim 1, wherein the fibers are stretched before being led through the acoustic field.

4. A method as claimed in claim 1, wherein the fibers are stretched after being led through the acoustic field.

5. A method as claimed in claim 1, wherein the fibers are stretched while being led through the acoustic field.

6. A method as claimed in claim 1, wherein the fibers are made of polyamide.

References Cited

UNITED STATES PATENTS

| | | | |
|---|---|---|---|
| 3,084,020 | 4/1962 | Loosli | 8—137 X |
| 2,970,073 | 1/1961 | Prange | 8—137 X |

MAYER WEINBLATT, Primary Examiner

U.S. Cl. X.R.
8—103; 134—1